US005794872A

United States Patent [19]

Shimamura

[11] Patent Number: 5,794,872

[45] Date of Patent: Aug. 18, 1998

[54] FILM FEEDING APPARATUS

[75] Inventor: Yasunobu Shimamura, Wakayama, Japan

[73] Assignee: Noritsu Koki Co., Ltd., Wakayama, Japan

[21] Appl. No.: 717,810

[22] Filed: Sep. 24, 1996

[30] Foreign Application Priority Data

Sep. 25, 1995 [JP] Japan .................................... 7-245681

[51] Int. Cl.$^6$ ............................ G03D 3/08; B65H 20/00; G03B 1/56

[52] U.S. Cl. ....................... 242/332.2; 396/612; 226/183; 242/562.1

[58] Field of Search ................................ 242/332, 332.2, 242/559, 559.3, 560.2, 560.3, 562.1, 563, 564.3, 564.4; 396/599, 612, 620; 355/27, 28; 226/91, 92, 174, 176, 183, 189

[56] References Cited

U.S. PATENT DOCUMENTS

| | | | |
|---|---|---|---|
| 3,883,054 | 5/1975 | Butschek | 242/562.1 |
| 4,643,371 | 2/1987 | Wurfel et al. | 242/562.1 |
| 5,373,338 | 12/1994 | Yamaguchi et al. | 396/612 |
| 5,463,441 | 10/1995 | Yamaguchi . | |
| 5,617,986 | 4/1997 | Kawamura | 226/183 |

*Primary Examiner*—John P. Darling

*Attorney, Agent, or Firm*—Felfe & Lynch

[57] ABSTRACT

A film feeding apparatus includes a roller pair for pinching a film stored and wound within a film container or its leader, and a restricting passage for restricting a posture of a non-pinched portion of the film or its leader. The roller pair is disposed in such a manner that the film or its leader is entrained about one roller of the roller pair in an arcuate form toward an upstream side in a film feeding direction relative to a pinching position of the roller pair. With driving rotation of the roller pair pinching the film or its leader, the film is withdrawn from the film container held at a holding portion to be fed to a film processing section. The restricting passage is curved along an entraining passage of the roller for the film or its leader as the restricting passage is viewed in a direction of an axis of the roller.

11 Claims, 6 Drawing Sheets

FILM FEEDING APPARATUS

BACKGROUND OF THE INVENTION

1. Field of the Invention

The present invention relates to a film feeding apparatus including a roller pair for pinching a film stored and wound within a film container or its leader, a restricting passage for restricting a posture of a non-pinched portion of the film or its leader, the roller pair being disposed in such a manner that the film or its leader is entrained about one roller of the roller pair in an arcuate form toward an upstream side in a film feeding direction relative to a pinching position of the roller pair. In operation, with driving rotation of the roller pair pinching the film or its leader, the film is withdrawn from the film container held at a holding portion to be fed to a film processing section.

2. Description of the Related Art

According to the above-described film feeding apparatus, the film or its leader is entrained in an arcuate form to a more upstream side in the film feeding direction than the pinching position of the roller pair relative to one roller of the roller pair. Hence, with this construction, it is easy to secure a large contact area between the rollers and film or its leader, so that in association with the driving rotation of the rollers on the film or its leader with reduced slippage relative thereto the film may be withdrawn from the film container in an efficient manner to be fed to the film processing section such as a film developing section. However, according to a conventional film feeding apparatus, as shown in FIG. 9, a roller pair comprised of a single drive roller 01 and two press rollers 02 disposed along the periphery of the drive roller 01 functions to pinch the film or its leader 03 therebetween and the film or its leader 03 is entrained about the drive roller 01 in an arcuate form at a position between the two press rollers 02. Further, a restricting passage 04 for restricting the posture of the non-pinched portion of the film or its leader 03 is provided in a substantially straight form as viewed in a direction of the axis of the drive roller 01.

Incidentally, a reference numeral 05 denotes a patrone as an example of the film container.

In order to secure a still greater area of contact between the drive roller 01 and the film or its leader 03 thereby to further reduce the slippage therebetween for the final purpose of achieving more efficient feeding of the film from the patrone 05 to the film processing section such as a film developing section, an entraining passage 06 of the drive roller 01 relative to the film or its leader 03 should be as long as possible. However, if this entraining passage 06 is extended, this will result in significant curving of the non-pinched portion of the film or its leader 03 along this elongated entraining passage 06. As a result, there arises necessity of increasing a distance between guide members 07 forming the restricting passage 04 so as to provide the restricting passage 04 with a greater width 08 in the direction of thickness of the film or its leader. In this case, the restricting passage 04 may not be able to effectively restrict the posture of the non-pinched portion of the film or its leader.

SUMMARY OF THE INVENTION

The present invention addresses to the above-described state of the art. A primary object of the invention is to provide an improved film feeding apparatus capable of withdrawing a film from a film container in a more efficient manner thus feeding more efficiently this film to a film processing section such as a film developing section and capable, at the same time, of effectively restricting a posture of a non-pinched portion of the film or its leader.

For accomplishing the above-noted object, a film feeding apparatus, according to one aspect of the present invention, comprises:

- a roller pair for pinching a film stored and wound within a film container or its leader;
- a restricting passage for restricting a posture of a non-pinched portion of the film or its leader;
- wherein the roller pair is disposed in such a manner that the film or its leader is entrained about one roller of the roller pair in an arcuate form toward an upstream side in a film feeding direction relative to a pinching position of the roller pair;
- with driving rotation of the roller pair pinching the film or its leader, the film is withdrawn from the film container held at a holding portion to be fed to a film processing section; and
- the restricting passage is curved along an entraining passage of the roller for the film or its leader as the restricting passage is viewed in a direction of an axis of the roller.

With the above construction, the length of the entraining passage of the roller for the film or its leader may be extended to increase the contact area between the roller and the film or its leader thereby to minimize occurrence of slippage therebetween, and at the same time, the width of the restricting passage in the direction of thickness of the film or its leader may be reduced.

As a result, the invention has fully accomplished its intended object of providing an improved film feeding apparatus capable of withdrawing a film from a film container in a more efficient manner thus feeding more efficiently this film to a film processing section such as a film developing section and capable, at the same time, of effectively restricting a posture of a non-pinched portion of the film or its leader.

According to a further aspect of the invention, the roller pair is disposed in such a manner as to cause the film container to apply its own weight as a tension on the film or its leader.

With this, the weight of the film container is applied as a force for pressing the film or its leader against the roller along the arcuate form. Hence, the occurrence of slippage between the roller and the film or its leader may be effectively reduced, without having to providing any special tension applying means.

According to a still further aspect of the invention, the apparatus further comprises:

- switchover means for switching over the roller pair between a pinching state and a pinching released state;
- supplying means for supplying the film or its leader to the roller pair which is switched over to the pinching released state;
- detecting means for detecting supply of the film or its leader to the roller pair which is switched over to the pinching released state; and
- control means for causing the switchover means to switch over the roller pair to the pinching state based on detection information of the detecting means.

With this construction, it is possible to insert the film or its leader into the entraining passage of the roller with greater reliability.

According to a still further aspect of the invention, the apparatus further comprises a regulating member capable of regulating the contact of the film or its leader relative to the roller by elastically urging the film or its leader away from the roller when the film or its leader is supplied to the roller pair which is switched over to the pinching released state.

With this construction, it is possible to reduce frictional resistance due to the contact between the film or its leader and the roller when the film or its leader is to be introduced into the entraining passage of the roller. As a result, the film or its leader may be introduced into the entraining passage of the roller in a more efficient manner.

According to a still further aspect of the invention, the roller pair includes a drive roller about which the film or its leader is entrained in the arcuate form, and a plurality of press rollers capable of pinching the film or its leader entrained about the drive roller at a plurality of positions away from each other along the entraining passage in cooperation with the drive roller.

With this construction, it is possible to cause the film or its leader located between the adjacent press rollers along the entraining passage to be pressed against the drive roller in a stable manner.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of an apparatus according to the invention will now described in details with reference to the accompanying drawings.

Figure 1:
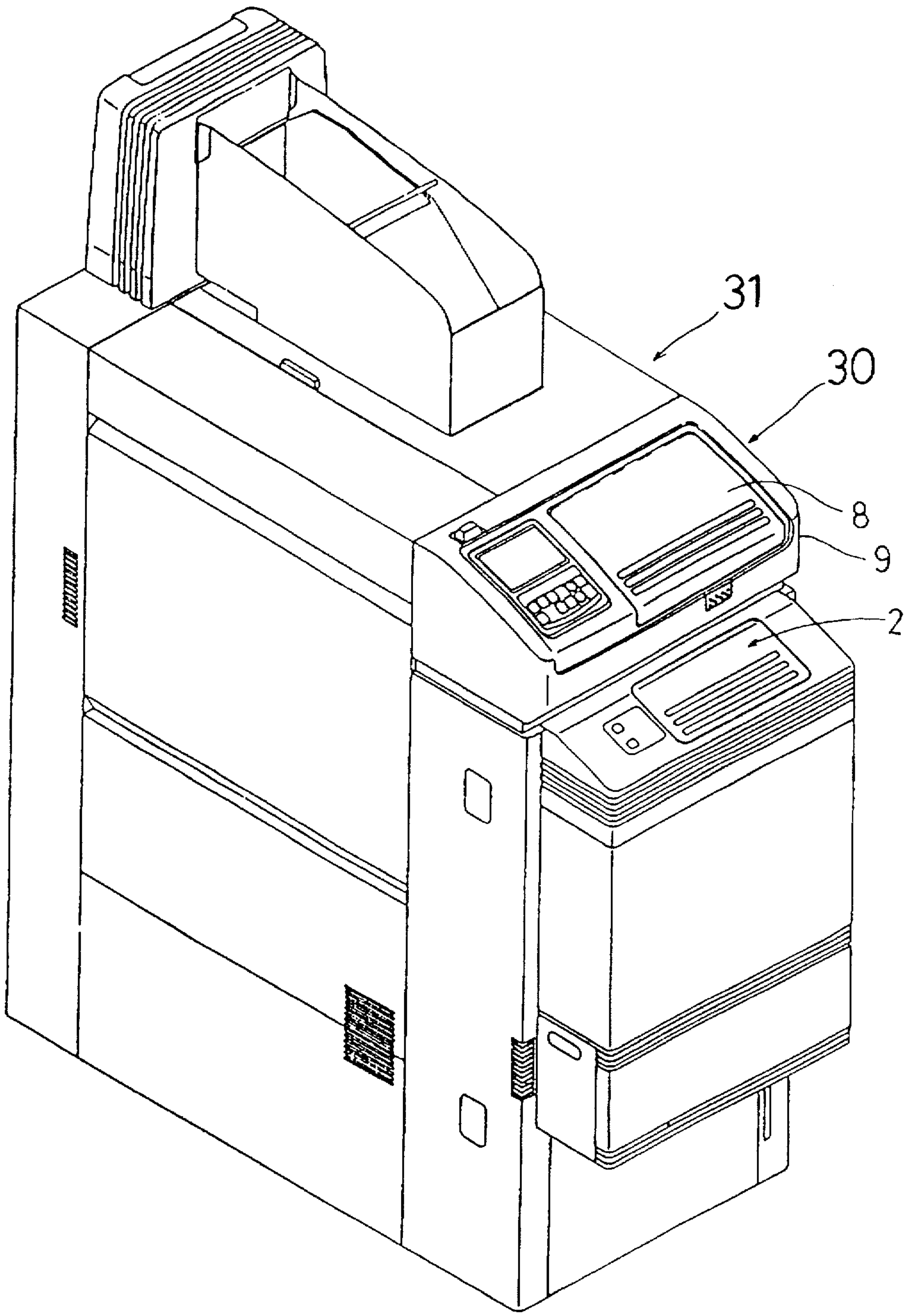
FIG. 1 is a perspective view of a film feeding apparatus.
Figure 2:
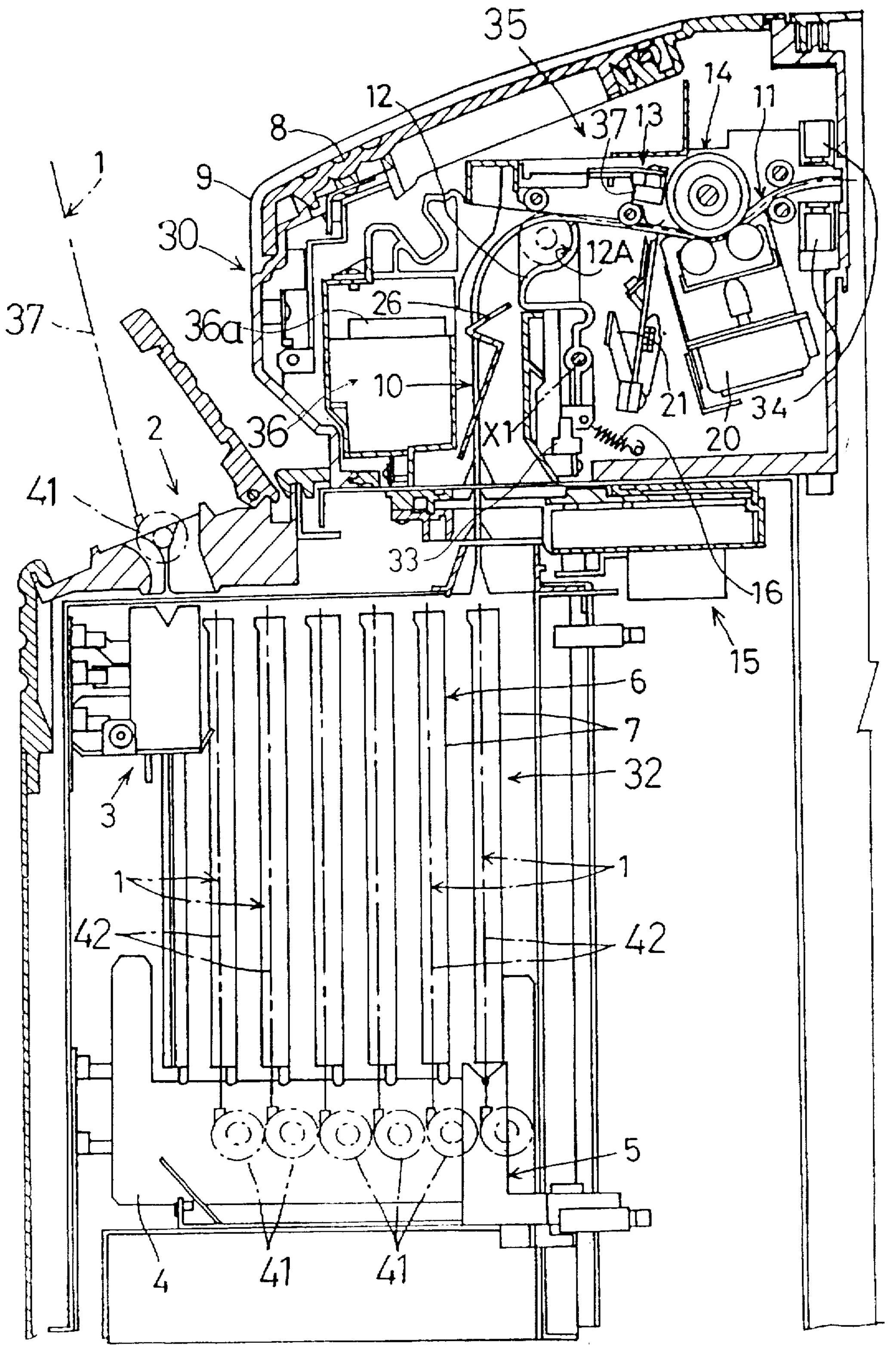
FIG. 2 is a side view in section showing the inside of the film feeding apparatus.
Figure 3:
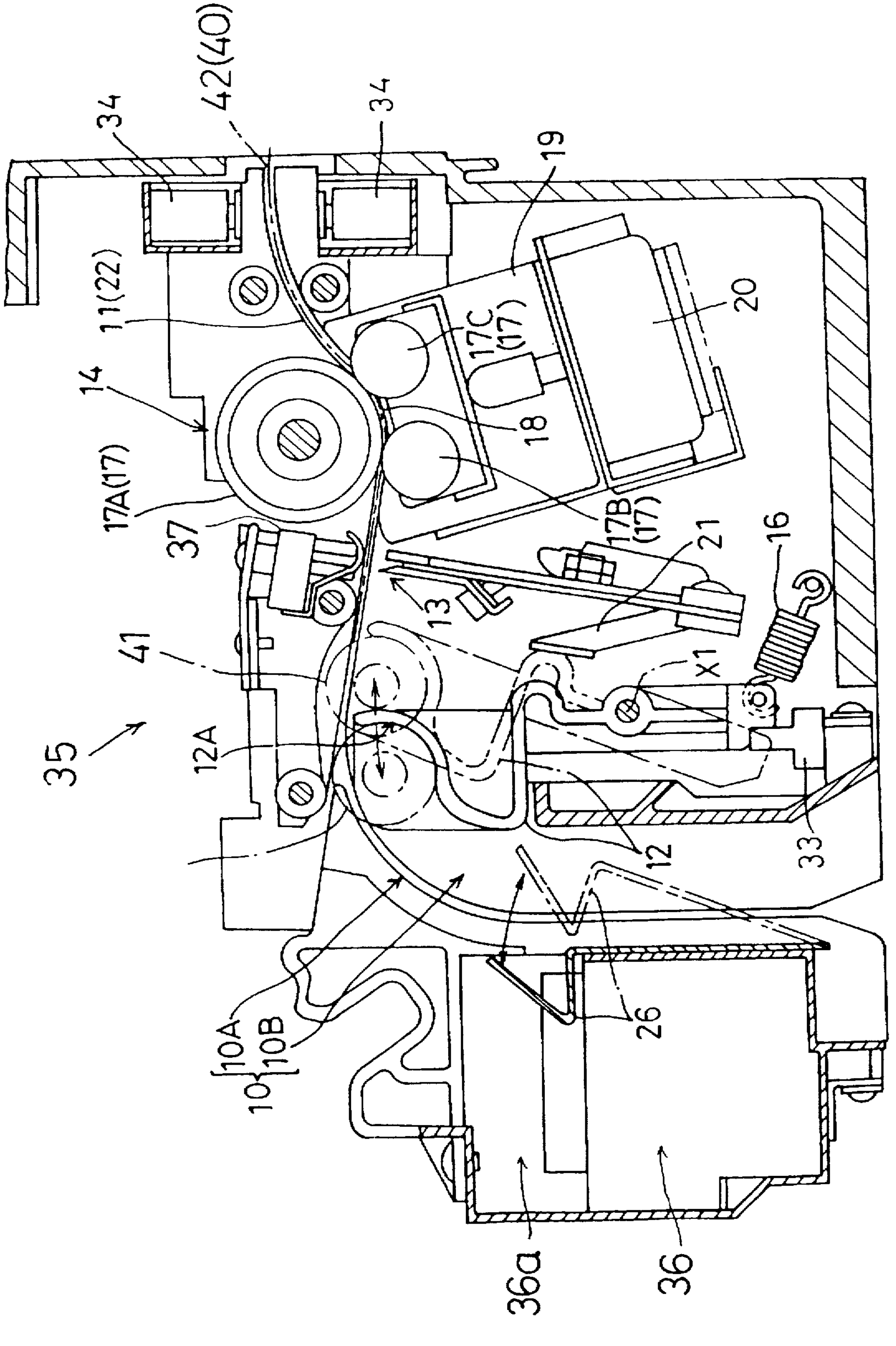
FIG. 3 is an enlarged side view showing major portions of the inside of the film feeding apparatus.

FIGS. 1, 2 and 3 a film feeding apparatus 30 for withdrawing films 40 stored in a wound state within film patrones 41 as a film container and then feeding these films 40 to a developing section 31 as a film processing section. This film feeding apparatus 30 includes a film loading section 32 into which the plurality of films 40 stored in the patrones 41 are loaded, and a film feeding section 35 for feeding the films 40 sent one after another from the film loading section 32 to the developing section 31. The film feeding section 35 incudes a patrone discharging section 36 for discharging the patrone 41 from which the film 40 has been withdrawn from the film feeding section 35 to a discharging passage **36*a***.

Figure 8:
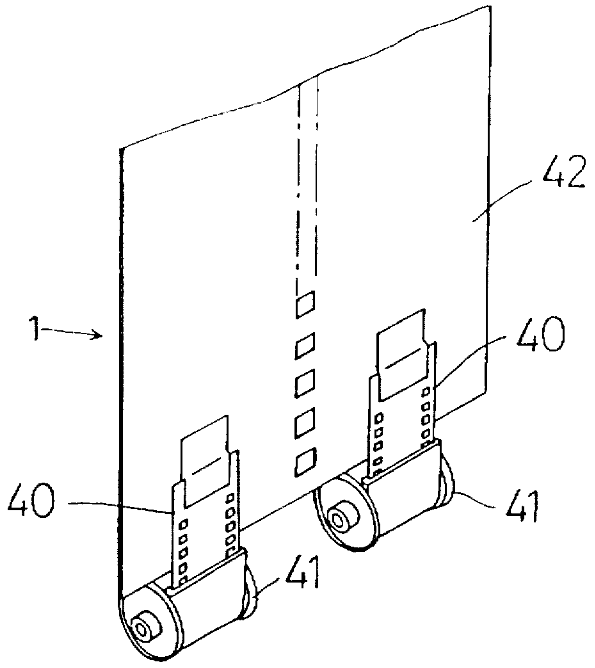
FIG. 8 is a perspective view of a film splicing assembly.
Figure 9:
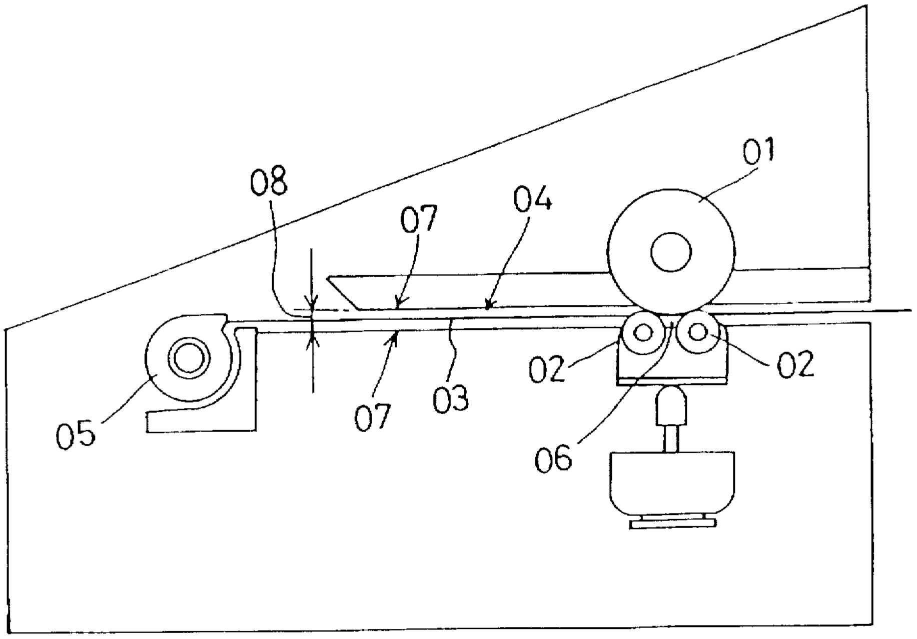
FIG.9 (Prior Art)
FIG. 9 is a schematic side view showing major portions of a conventional apparatus.

Referring to the film 40 stored within the patrone 41, a rear end thereof with respect to the withdrawing direction is fixed inside the patrone 41. Further, as shown in FIG. 8, in the film loading section 32, two patrones 41 within which the films 40 are wound and stored are combined as one group, then, there are loaded a plurality of film splicing assemblies 1 each assembly consisting of a single leader 42 joined to leading ends of the two rolls of films withdrawn from the patrones 41.

Incidentally, in the instant embodiment, the single leader 42 joins two patrones 41 or cartridges as one group. Instead, only one may be joined to the leader 42.

The film loading section 32 includes a loading opening 2 into which the film splicing assemblies 1 are set with the leaders 42 thereof being oriented upward, a downward transporting device 3 for downwardly feeding the set film splicing assemblies 1 inside this film loading section 32, a lateral transporting device 4 for laterally transporting the film splicing assemblies 1 fed by the downward transporting device 3 inside the film loading section 32, and an upper transporting device 5 for upwardly transporting the film splicing assemblies 1 which have been transported laterally by the lateral transporting device 4, one after another from the side of the leader 42 thereof to the film feeding section 35.

Referring to the lateral transporting device 4, a pair of bar conveyers 6 each defining an elongate slot are disposed at opposed sides within the film loading section 32. And, a plurality of pairs of these bar conveyers 6 are equi-distantly mounted on a conveyer chain. In operation, while the film splicing assembly 1 set at the loading opening 2 is being downwardly fed by the downward transporting device 3, opposed side ends of its leader 42 are inserted and engaged into the elongate slots of the opposed guide bars 7, whereby the film splicing assembly 1 is vertically supported by the guide bars 7 with its leader 42 being oriented upwards. Under this condition, the lateral transporting device 4 laterally transports the assembly to the upward transporting device 5 by turning of the bar conveyers 6 about a vertical axis.

Inside a case 9 having a vertically openable lid 8, the film feeding section 35 includes a splicing assembly passage 10 in which the film splicing assembly 1 fed by the upward transporting device 5 is caused to pass with the leader 42 thereof being at the forward end, a slit-like film passage 11 in which the leader 42 together with the films 40 is caused to pass toward the developing section 31, a holder 12 as a holding portion for holding the patrone 41 by holding it with a concave face portion 12A thereof, a cutter device 13 for cutting the rear end of the film 40 when this film 40 stored within the patrone 41 is to be fed to the developing section 31, a pinch transporting device 14 for pinching the leader 42 and the films 40 having passed through the splicing assembly passage 10 into the film passage 11 and transporting these toward the developing section 31, and a shutter device 15 capable of selectively opening and closing an entrance opening to the splicing assembly passage 10.

The splicing assembly passage 10 includes a slit-like leader passage 10A through which the leader 42 passes and a patrone passage 10B through which the patrone storing the film 40 passes. And, the leader passage 10A is continuously communicated with the film passage 11. Within this film passage 11, there is provided a passage-detecting sensor 37 using a limit switch or the like for detecting passage or non-passage of the leading end of the leader 42.

The concave face portion 12A of the holder 12 is pivotable about a horizontal axis X1 along the patrone passage 10B, and a coil spring 16 is provided for urging the concave face portion 12A to the upstream side of the patrone passage 10B.

The pinch transporting device 14 includes two roller pairs 17 each pair including a drive roller 17A about which the films 40 or its leader 42 is entrained in an arcuate form, and two free rollers 17B, 17C for pinching the films 40 or its leader 42 entrained about the drive roller 17A in cooperation with the drive roller 17A at two separate positions along an entraining passage 18, with the two roller pairs 17 being disposed side by side in the direction of the width of the film passage 11 in the moving path of the two rolls of films 40 fed from the patrones 41.

Figure 5:
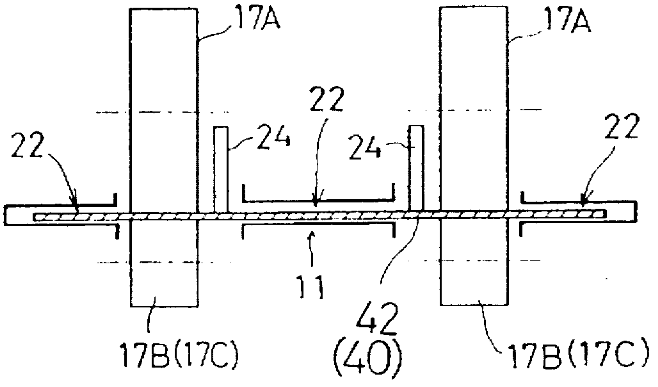
FIG. 5 is a front view of the major portions.
Figure 6:
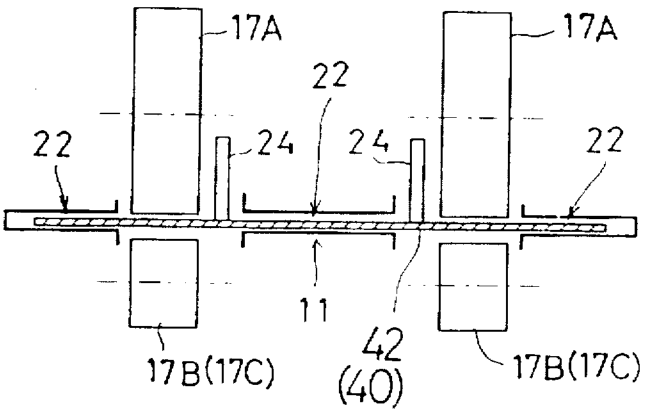
FIG. 6 is a front view of the major portions.

Further, a solenoid device 20 is provided for switching over the roller pairs 17 between a pinching state and a pinching released state by moving a frame 19 mounting the free rollers 17B, 17C thereon to and away from the drive rollers 17A. Also, as shown in FIGS. 5 and 6, a side portion of the film passage 11 adjacent the entraining passage 18 is constructed as a restricting passage 22 for restricting the posture of the non-pinched portion of the films 40 or its leader 42. The upward transporting device 5 is constructed as a supplying means for supplying the leader 42 of the film splicing assembly 1 to the roller pairs 17 which are switched over to the pinching released state, i.e. between the drive rollers 17A and the press rollers 17B, 17C.

Accordingly, each roller pair 17 is disposed in such a manner that relative to one roller, i.e. the drive roller 17A of each roller pair 17 the roller pair 17 entrains the films 40 or its leader 42 in an arcuate form to a more upstream side in the film feeding direction than a pinching position of the press rollers 17C of this roller pair 17. Also, the restricting passage 22 is curved along the entraining passage 18 of the drive roller 17A for the films 40 or its leader 42 as the restricting passage 22 is viewed in a direction of the axis of the drive roller 17A.

Referring more particularly to the shape of the restricting passage 22, a portion of the passage located upstream relative to the contact portion between the drive roller 17A and the upstream press roller 17B is formed like a substantially straight line tangential to the drive roller 17A and to the upstream press roller 17B. A subsequent portion of the passage extending between the two press rollers 17B, 17C is formed like an arcuate line extending along the outer peripheral face of the drive roller 17A. The further subsequent passage portion located downstream relative to the contact portion between the drive roller 17A and the downstream press roller 17C is formed like a substantially arcuate line having a relatively large radius of curvature. Also, the restricting passage 22 extends tangentially to the drive roller 17A and the downstream press roller 17C as well. Moreover, the curvature of the third passage portion located downstream relative to the contact portion between the drive roller 17A and the downstream press roller 17C has the opposite sign or direction to that of the drive roller 17A.

Figure 7:
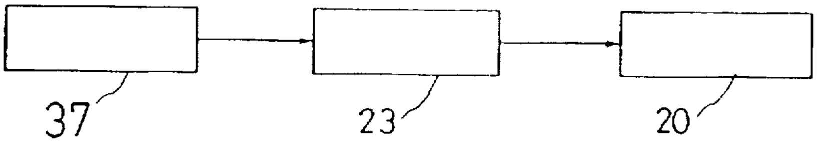
FIG. 7 is a control block diagram.

Further, as shown in FIG. 7, there are provided a passage detecting sensor 37 acting as a detecting means for detecting supply of the leader 42 to the roller pair 17 which is switched over to the pinching released state, and a control device 23 acting as a control means for causing the solenoid device 20 to switch over the roller pairs 17 to the pinching state based on the detection information from the passage detecting sensor 37. Then, in operation, when the leading end of the leader 42 of the film splicing assembly 1 fed by the upward transporting device 5 is caused to pass through the splicing assembly passage 10 into the film passage 11 and then this is further moved to pass between the drive rollers 17A and the free rollers 17B, 17C, this passage is detected by the passage detecting sensor 37. Upon this detection, the roller pairs 17 are switched over to the pinching state to pinch the leader 42 and also the drive rollers 17A are driven to feed the leader 42 toward the developing section 31.

With the feeding of the leader 42 by the drive rollers 17A toward the developing section 31, the patrones 41 are pulled and moved along the patrone passage 10B. Then, this movement is checked when these patrones 41 come to be held by the holder 12. Thereafter, the films 40 wound and stored within these patrones 41 are withdrawn therefrom. With completion of the withdrawal of the films 40 from the patrones 41, the holder 12 is pivoted against the urging force of the coil spring 16 until this holder 12 come into abutment against the stopper 21 towards the terminal end of the patrone passage 10B. Then, as the holder 12 turns ON a photo sensor 33, the cutter device 13 is activated to cut off the rear ends of the films 40, whereby the patrones 41 and the films 40 are separated from each other, and the films 40 are fed further toward the developing section 31. And, when the rear ends of the films are detected by a photo sensor 34, the roller pairs 17 are switched over to the pinching released state, and the patrones 41 are discharged into the discharging passage **36*a***.

Accordingly, when the roller pairs 17 pinch the leader 42 therebetween, the drive rollers 17A are driven to lift up the patrones 41 along the patrone passage 10B, whereby the weight of the patrones 41 are applied as a tension on to the leader 42.

Figure 4:
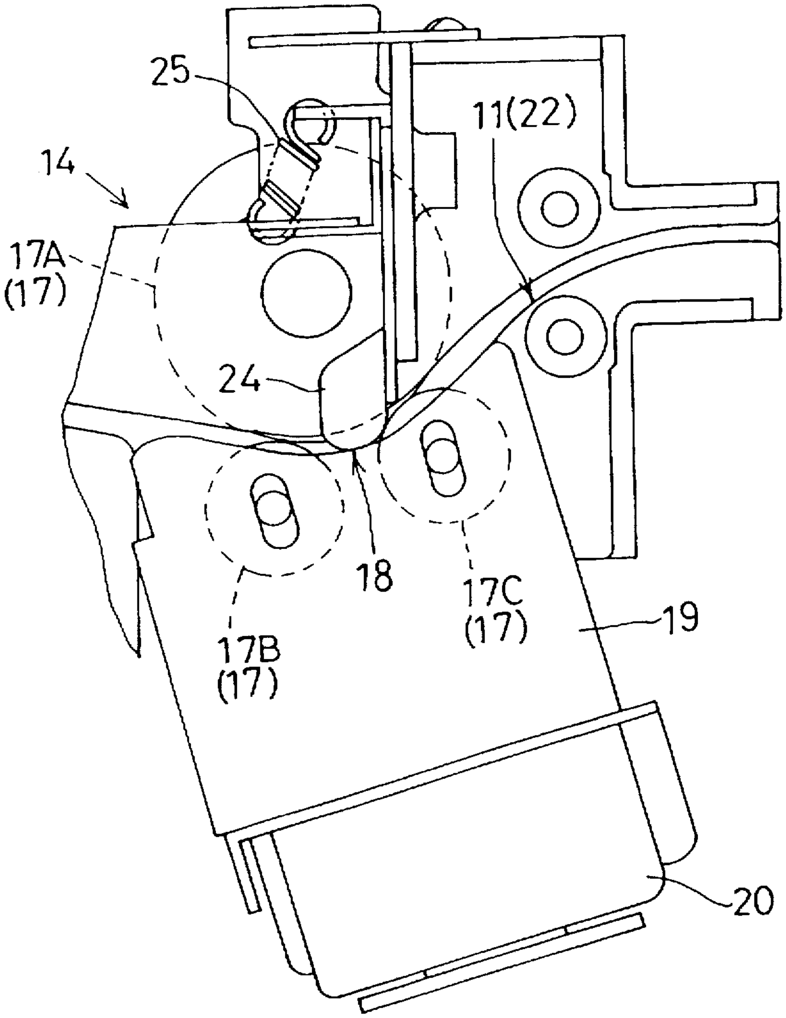
FIG. 4 is a side view of the major portions.

As shown in FIGS. 4 through 6, on the side of each roller pair 17, there is provided a regulating member 24 which is vertically slidable for regulating the contact of the leader 42 relative to the drive rollers 17A. More particularly, when the leader 42 is to be fed between the drive roller 17A and the press rollers 17B, 17C which are ready for receiving the leader 42 under the pinch released state, a coil spring 25 provides an elastic force for urging this leader 42 away from the drive roller 17A. In this manner, the contact between the drive roller 17A and the leader 42 may be regulated.

In the patrone discharging section 36, a discharge guide plate 26 is provided for receiving the patrone 41 chuted from the holder 12 and then discharging it to the discharging passage **36*a*. And, this discharge guide plate 26 is elastically and pivotably urged to project into the patrone passage 10B. In operation, when the patrone 41 on its way to the holder 12 comes to press the discharge guide plate 26 from the under, the discharge guide plate 26 is retracted toward the discharging passage 36*a* against the urging force described supra to allow the movement of the patrone 41 toward the holder 12. Then, after passage of the patrone 41, the guide plate 26 is urgedly pivoted to project into the patrone passage 10B, so as to discharge the patrone 41 into the discharging passage 36*a***.

[other embodiments]

1. The films stored in a plurality of film containers may not be joined to each other via a leader. Instead, the leading ends of the films stored within film containers may be fed one by one to the roller pairs which are switched over to the pinching released state, so as to feed these films to the film processing section.
2. In case the film container is of the type which is to be re-used for storing again in the wound state a film which was once withdrawn from the container and subjected to the developing process, the film withdrawn from the film container may be fed to a film processing section such as a printing section. Further, the apparatus may be adapted for feeding a film after its development to a film processing section where image information of respective frames of the developed film is scanned by a CCD scanner.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film feeding apparatus comprising:

a roller pair for pinching either a film stored and wound within a film container or a leader of the film;

a restricting passage for restricting a posture of a non-pinched portion of the film or the leader thereof;

wherein the roller pair is disposed in such a manner that the film or the leader thereof is entrained about one roller of the roller pair in an arcuate form toward an upstream side in a film feeding direction relative to a pinching position of the roller pair, and also the roller pair is disposed in such a manner as to cause the film container to apply its own weight as a tension on the film or the leader thereof;

with driving rotation of the roller pair pinching the film or the leader thereof, the film is withdrawn from the film container held at a holding portion to be fed to a film processing section; and the restricting passage of the one roller is curved along an entraining passage of the one roller for the film or the leader thereof as the restricting passage is viewed in a direction of an axis of the one roller.

2. A film feeding apparatus comprising:

a roller pair for pinching a film stored and wound within a film container or a leader of the film;

a restricting passage for restricting a posture of a non-pinched portion of the film or the leader thereof;

wherein the roller pair is disposed in such a manner that the film or the leader thereof is entrained about one roller of the roller pair in an arcuate form toward an upstream side in a film feeding direction relative to a pinching position of the roller pair;

with driving rotation of the roller pair pinching the film or the leader thereof, the film is withdrawn from the film container held at a holding portion to be fed to a film processing section;

the restricting passage of the one roller is curved along an entraining passage of the one roller for the film or the leader thereof as the restricting passage is viewed in a direction of an axis of the one roller;

switchover means for switching over the roller pair between a pinching state and a pinching released state;

supplying means for supplying the film or the leader thereof to the roller pair which is switched over to the pinching release state;

detecting means for detecting supply of the film or the leader thereof to the roller pair which is switched over to the pinching release state; and control means for causing the switchover means to switch over the roller pair to the pinching state based on detection information of the detecting means.

3. A film feeding apparatus as claimed in claim 2, further comprising: a regulating member capable of regulating the contact of the film or its leader relative to the one roller by elastically urging the film or its leader away from the one roller when the film or its leader is supplied to the roller pair which is switched over to the pinching released state.

4. A film feeding apparatus as claimed in claim 3, wherein the roller pair includes a drive roller about which the film or its leader is entrained in the arcuate form, and a plurality of press rollers capable of pinching the film or its leader entrained about the drive roller at a plurality of positions away from each other along the entraining passage in cooperation with the drive roller; and said regulating member is capable of regulating contact of the film or its leader relative to the drive roller.

5. A film feeding apparatus as claimed in claim 2, wherein said switchover means comprises a solenoid device.

6. A film feeding apparatus as claimed in claim 2, wherein said supplying means comprises an upward transporting device for upwardly transporting the film toward the roller pair with the leader of the film leading ahead of the film.

7. A film feeding apparatus as claimed in claim 6, wherein the roller pair is disposed in such a manner as to cause the film container to apply its own weight as a tension on the film or its leader.

8. A film feeding apparatus as claimed in claim 2, wherein said detecting means comprise a passage detecting sensor incorporated within a film passage through which the leader and the film are caused to pass toward the film processing section.

9. A film feeding apparatus as claimed in claim 8, wherein said passage detecting sensor detects passage or non-passage of the leading end of the leader.

10. A film feeding apparatus comprising:

a roller pair for pinching a film stored and wound within a film container or a leader of the film;

a restricting passage for restricting a posture of a non-pinched portion of the film or the leader thereof;

wherein the roller pair is disposed in such a manner that the film or the leader thereof is entrained about one roller of the roller pair in an arcuate form toward an upstream side in a film feeding direction relative to a pinching position of the roller pair;

with driving rotation of the roller pair pinching the film or the leader thereof, the film is withdrawn from the film container held at a holding portion to be fed to a film processing section; and a portion of the restricting passage on the downstream of the roller pair in the film feeding direction is curved along an entraining passage of the one roller for the film or the leader thereof as the restricting passage is viewed in a direction of an axis of the one roller.

11. A film feeding apparatus as claimed in claim 10, wherein the roller pair is disposed in such a manner as to cause the film container to apply its own weight as a tension on the film or the leader thereof.

* * * * *